Dec. 23, 1924.
H. DE W. SENITHA
SPRING WHEEL
Filed July 16, 1921
1,520,091
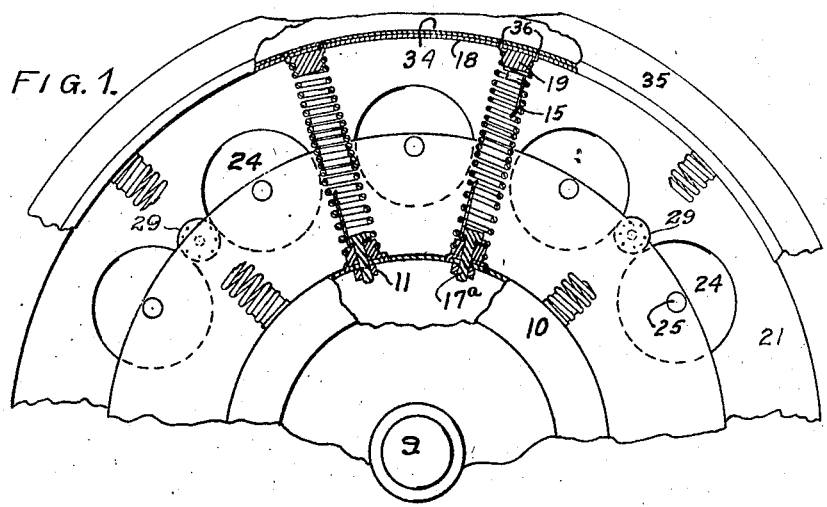
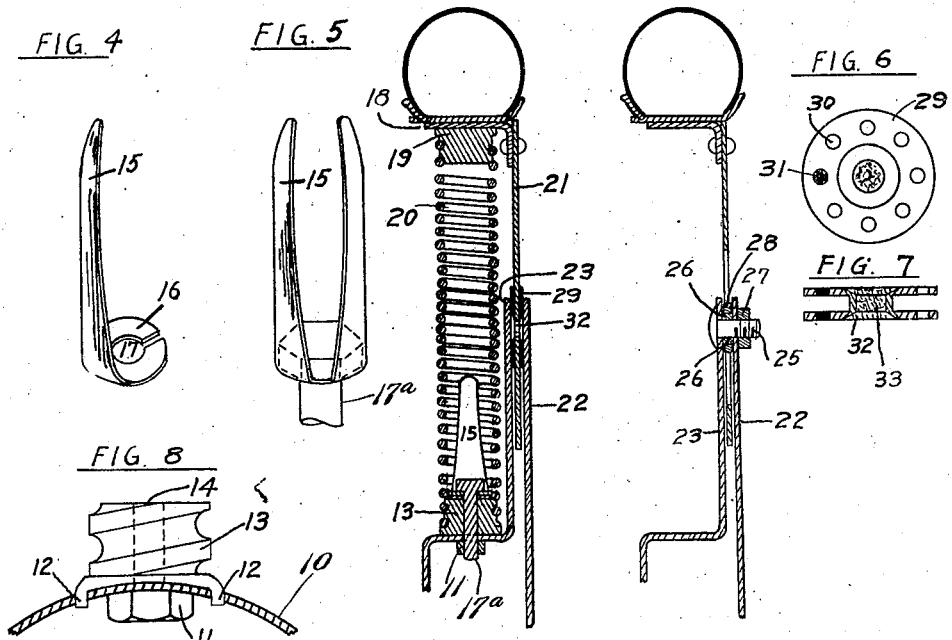
INVENTOR.
BY
ATTORNEY.

Patented Dec. 23, 1924.

1,520,091

UNITED STATES PATENT OFFICE.

HUGO DE WATTEVILLE SENITHA, OF WEEHAWKEN, NEW JERSEY.

SPRING WHEEL.

Application filed July 16, 1921. Serial No. 485,185.

*To all whom it may concern:*

Be it known that I, HUGO DE WATTEVILLE SENITHA, a citizen of the United States, residing in the town of Weehawken, county of Hudson, and State of New Jersey, have made certain new and useful Improvements in Spring Wheels, of which the following is a specification, reference being had to the accompanying drawings, which form a part of the same.

The object of my invention is to provide a spring wheel having resilient qualities.

Another object is to provide in connection with such wheel variably pitched springs to insure the fullest resiliency and at the same time being so constructed as to eliminate or greatly decrease breakage thereof.

Another object of my invention is to supplement the resistance of the springs to bending action outside of their normal functions.

Other objects of my invention will be apparent upon the reading of this specification taken in conjunction with the accompanying drawings in which—

Fig. 1 is a fragmentary view of a wheel partly in cross section embodying my invention.

Fig. 2 is an enlarged detail view in transverse cross section of one of the spring units of my wheel.

Fig. 3 is a transverse cross section of the driving and driven rings with other accessories.

Fig. 4 is a perspective view of a flexible pilot having a single prong to supplement the resistance against the displacement of the spring.

Fig. 5 is a similar view showing two prongs.

Fig. 6 is a lubricating washer; and

Fig. 7 is an axial cross section of Fig. 6; and

Fig. 8 is a detail of the spring connection to the hub of my wheel.

Referring now in detail to the drawings 9 represents the axle of a wheel and 10 is the hub thereof formed of hollow sheet metal. The periphery of this hub is provided with bolt holes over which on the inside are welded or otherwise integrally connected nuts 11 which are provided with female threads. Apertures are also provided in the periphery of the hub on each side of the nut 11 which accommodate lugs 12 which are integrally connected with the screw stud 13. These lugs 12 are preferably substantially parallel to each other, as shown. The screw stud is provided with a bolt hole 14 which registers with the hole of the nut 11. On this screw stud 13 is adapted to be fitted the pilot 15 which is provided with a flange 16 having the opening 17 adapted to register with the hole 14 of the screw stud. A bolt 17a extends through the openings of the pilot 15 through stud 13 and hub 10 and is screwed into the nut 11 making said elements a unitary construction. Opposite the elements so connected to the hub as described and within the felly 18 I have integrally connected the screw stud 19 which may also be provided with a pilot 15. Helical springs 20 are screwed over the studs 13 and 19 and are held in position thereon. These springs combine compression and extension qualities having closer windings in the center than at their terminals. The pitch of these windings gradually increases from their middle portion to the ends, the middle portion forming the tension area. These springs are designed to function both as tension and compression springs.

The felly 18 is bolted or otherwise integrally secured to an annular ring 21 which is slidably fitted between the discs 22 and 23 which form one unit with the hub. The annular ring 21 is provided with circular openings 24 through which bolts 25 connect the discs 22 and 23 together. Inserted between said discs 22 and 23 is a spacing ring 26 which surrounds the shank of the bolt 25 permitting the said discs to be fastened together in spaced relation to each other by the connection of the said bolt and nut 27. Surrounding the spacing ring 26 and carried in loose relation therewith is a rotatable sleeve roller 28. The length of this roller is short enough to permit it to be freely rotated between the discs 22 and 23.

I have provided between the disc 22, annular ring 21 and disc 23 lubricating means in the form of a washer 29 made of antifriction material and provided with a number of apertures 30 in which grease or other hard lubricants may be placed, a filled aperture being shown at 31. These washers are used in pairs and are connected together by a tubular rivet 32 which also passes through the annular ring 21. In the tubular rivet 32 I have provided absorbent material 33 for the purpose of carrying oil or other lubricants. These antifriction washers are positioned on the annular ring 21 between circular openings 24 as indicated in Fig. 1. The rim of the wheel is designated as 34 and the tire as 35. The stud 19 is provided with lugs 36. In practice the stud 19 is fitted into apertures in the felly 18 and the rim 34 and the three elements, the stud, felly and rim are electrically welded together. Of course these elements may be connected together by any other efficient method.

It will be seen that in the riding of the wheel the periphery will be given a resilient movement by reason of the same being connected to the hub of the wheel by spring connections and the alignment of the periphery with the hub is maintained by a slidable connection therewith through the annular ring 21 with the discs 22 and 23, the said discs being rigidly held together in spaced relationship by the spacing member 26 on which is carried the free roller 28. Provision is made for a limited movement between the annular ring 21 and the discs 22 and 23 by reason of the circular spaces 24 through which the discs 22 and 23 are fastened together by the bolt 25. This permits any movement which might be described by the bolts in said space whether arcuate, radial, spiral or otherwise, during the riding of the wheel. This movement or shifting of the annular ring 21 with reference to the discs 22 and 23 is limited by the sides of the circular spaces 24 in the annular ring and when said elements, the annular ring on the one hand and the discs on the other reach their limit of movement the roller 28 on the spacing ring 26 is brought into play. The tendency of the relative parts of the wheel is always to the normal position shown in Fig. 1 of the drawings. In starting the rolling of such wheel where the power is imparted to it through the hub the discs 22 and 23 travel a little forward of the annular ring 21 but after the strain of starting has passed the relative position of the parts will assume normal or substantially normal position.

To supplement the natural resistance of the spring against being thrown out of radial alignment with the two studs 13 and 19 the pilot 15 consisting of one or more prongs extends upwardly or downwardly within the windings of the springs. In the event of a shifting of the annular ring 21 with reference to the discs 22 and 23 the radial alignment of the springs is thrown out but an additional resistance is furnished by the pilots which are preferably made of spring metal and instead of giving the spring a sharp strain at its base its relationship thereto is maintained and the tension is largely taken up by the central or closely wound portion of the spring, where this strain can best be exerted without damaging effect to the spring such as breakage or distortion.

During the riding of the wheel there is a constant shifting going on between the annular ring 21 and the discs 22 and 23 which requires lubrication. The lubricating washers shown in Figs. 6 and 7 and shown in position in Fig. 2 are provided for this purpose. The holes 30 being filled with hard lubricating material and the hole 33 being filled with absorbent material soaked with oil it will be seen that constant lubrication takes place between these moving parts, namely, the annular ring 21 and the discs 22 and 23.

I have described what I believe to be the best embodiment of my invention. I do not wish to be limited however to the embodiment shown, but what I desire to cover by Letters Patent is set forth in the appended claims.

Claims:

1. In a spring wheel, a hub and a felly, an annular ring secured to said felly and a pair of parallel discs secured to said hub, the annular ring being adapted to slide between the inner faces of said discs, means for holding said pair of discs in spaced relation to each other permitting the free movement of the said annular ring with reference to said discs, means for lubricating adjacent parts of said annular ring and said discs, studs carried by the hub and felly, and springs adapted to be connected to said studs, in radial alignment with the said hub and felly, pilots in said springs to resist the movement of said springs out of radial alignment, and means for permitting the relative movement of the said annular ring and said discs with reference to each other to a limited degree.

2. In a spring wheel, a hub and a felly, an annular ring secured to said felly and a pair of parallel discs secured to said hub, the annular ring being adapted to slide between the inner faces of said discs, means for holding said pair of discs in spaced relation to each other permitting free movement of the said annular ring with reference to said discs, studs carried by the hub and felly, and springs adapted to be connected to said studs in radial alignment with the said hub and felly, resilient pilots for said springs to resist the movement of said springs out of radial alignment, and means for permitting the relative movement of the said annular ring and said discs with reference to each other to a limited degree.

3. In a spring wheel, a hub and felly, springs of variable pitch, an annular ring secured to said felly, and a pair of parallel discs secured to said hub, the annular ring being adapted to slide between the inner faces of said discs, means for holding said pair of discs in spaced relation to each other permitting the free movement of the said annular ring with reference to said discs, means for lubricating adjacent parts of said annular ring and said discs consisting of washers on each side of said annular ring and connected to each other through the said annular ring, said washers being provided with lubricant carrying apertures, and means for permitting the relative movement of said annular ring and said discs with reference to each other to a limited degree.

4. In a spring wheel, a hub and a felly, an annular ring secured to said felly and a pair of parallel discs secured to said hub, the annular ring being adapted to slide between the inner faces of said discs, means for holding said discs in spaced relation to each other, permitting the free movement of the said annular ring with reference to said discs, means for lubricating adjacent parts of said annular ring and said discs, consisting of washers on each side of said annular ring and connected to each other through the said annular ring, said washers being provided with lubricant carrying apertures, studs carried by the hub and felly, and springs adapted to be connected to said studs in radial alignment with the said hub and felly, and means for permitting the relative movement of the said annular ring and said discs with reference to each other to a limited degree.

5. In a spring wheel embodying a hub and felly, and an annular ring secured to said felly, and a pair of parallel discs secured to said hub, the annular ring being adapted to slide between the inner faces of said discs, helical springs connecting said felly to said hub, windings of said springs being relatively close at the central portion thereof and relatively loose at the end portions thereof.

6. In a spring wheel comprising a hub and a felly, an annular ring secured to said felly, and a pair of parallel discs secured to said hub, the annular ring being adapted to slide between the inner faces of said discs, spring members between said felly and hub, lubricating means comprising washers having apertures for carrying lubricants, said washers being maintained between the said discs and the said annular ring.

7. In a spring wheel, comprising a hub and a felly and an annular ring secured to said felly and a pair of parallel discs secured to said hub, the annular ring being adapted to slide between the inner faces of said discs, and helical springs connecting said felly and hub, resilient pilots for said helical springs for resisting the lateral bending of said springs at or near their terminals.

8. In a spring wheel embodying a hub and felly, means for maintaining said hub and felly in co-operative relationship to each other, springs of variable pitch and resilience, means for maintaining said springs uniform or in systematic relation to each other, means for providing antifrictional relationship between the co-operative parts, means for providing for thermal and hygroscopic expansion and contraction in relation thereto, and means for limiting the movement of the co-operative parts.

9. In a spring wheel embodying a hub and felly, means for maintaining said hub and felly in co-operative anti-frictional relationship with each other, springs of variable resilience between said co-operative parts, means for maintaining said springs therebetween, and means for limiting the movement of the co-operative parts.

10. In a spring wheel embodying a hub and felly, means for maintaining said hub and felly in co-operative anti-frictional relationship with each other, springs of variable resilience between said co-operative parts, means for maintaining said springs therebetween, means for variably resiliently resisting distortion of said springs in relation to their longitudinal axes, and means for limiting the movement of the said co-operative parts.

11. In a spring wheel embodying a hub and felly, means for maintaining said hub and felly in co-operative anti-frictional relationship with each other, springs between the co-operative parts, means for maintaining said springs therebetween, means for variably resiliently resisting distortion of said springs in relation to their longitudinal axes, and means for limiting the movement of the said co-operative parts.

12. In a spring wheel embodying a hub and felly, means for maintaining said hub and felly in co-operative anti-frictional relationship with each other, springs between the co-operative parts and means for maintaining said springs therebetween, means for resiliently resisting distortion of said springs in relation to their longitudinal axes, and means for limiting the movement of the co-operative parts.

13. In a spring wheel embodying a hub and felly, means for maintaining said hub and felly in co-operative anti-frictional relationship with each other, springs of variable resilience between the co-operative parts, and means for maintaining said springs therebetween, means for resiliently resisting distortion of said springs in relation to their longitudinal axes, and means for limiting the movement of the co-operative parts.

14. In a spring wheel embodying a hub and felly, means for maintaining said hub and felly in co-operative anti-frictional relationship with each other, springs of variable resilience between the said co-operative parts, and means for maintaining said springs therebetween, means for resisting distortion of said springs in relation to their longitudinal axes, and means for limiting the movement of the co-operative parts.

15. In a spring wheel embodying a hub and felly, means for maintaining said hub and felly in co-operative relationship with each other, resilient means for transmitting power between the axis and periphery, means for maintaining resilient relation between said axis and periphery with respect to concentricity, means for maintaining the resilient members between the co-operative parts, means for limiting the movement of the co-operative parts, and means for maintaining the co-operative parts in anti-frictional relationship to each other.

16. In a spring wheel embodying a hub and felly, means for maintaining said hub and felly in co-operative relationship with each other, variably resilient means for transmitting power between the axis and the periphery, means for maintaining resilient relation between said axis and periphery with respect to concentricity, means for maintaining the resilient members between the co-operative parts, means for limiting the movement of the co-operative parts, and means for maintaining the co-operative parts in anti-frictional relationship to each other.

17. In a spring wheel embodying a hub and felly, means for maintaining said hub and felly in co-operative relationship with each other, resilient means for transmitting power between the axis and periphery, means for maintaining variably resilient relation between said axis and periphery with respect to concentricity, means for maintaining the resilient members between the co-operative parts, means for limiting the movement of the co-operative parts, and means for maintaining the co-operative parts in anti-frictional relationship to each other.

18. In a spring wheel embodying a hub and felly, means for maintaining said hub and felly in co-operative relationship with each other, variably resilient means for transmitting power between the axis and the periphery, means for maintaining variably resilient relation between said axis and periphery with respect to concentricity, means for maintaining the resilient members between the co-operative parts, means for limiting the movement of the co-operative parts, and means for maintaining the co-operative parts in anti-frictional relationship to each other.

19. In a spring wheel means for maintaining axis and periphery in substantially right angle co-operative anti-frictional relation to each other, springs providing for compression and extension between the co-operative parts, means for maintaining said springs therebetween, means for resiliently increasing the resistance in relation to the torque movement between the axis and periphery, and means for limiting movement.

20. In a spring wheel means for maintaining axis and periphery in substantially right angle co-operative anti-frictional relation to each other, springs between the co-operative parts providing for compression and extension with variable resilience, means for maintaining said springs therebetween, and means for resiliently increasing the resistance in relation to the torque movement between the axis and periphery, and means for limiting movement.

21. In a spring wheel means for maintaining axis and periphery in substantially right angle co-operative anti-frictional relation to each other, springs therebetween wound for compression and suspension providing for systematically increasing resistance, means for maintaining said springs between co-operative parts, and means for resiliently increasing the resistance in relation to the torque movement between the axis and periphery, and means for limiting movement.

H. DE WATTEVILLE SENITHA.